United States Patent [19]
Helling

[11] 3,923,115
[45] Dec. 2, 1975

[54] HYBRID DRIVE
[76] Inventor: Juergen Helling, Nizzaallee 36, 51 Aachen, Germany
[22] Filed: Oct. 26, 1972
[21] Appl. No.: 301,154

[30] Foreign Application Priority Data
Oct. 29, 1971 Germany............................ 2153961

[52] U.S. Cl................ 180/65 A; 74/751; 290/45; 318/161
[51] Int. Cl.²............................................. B60K 9/04
[58] Field of Search .... 180/65 A, 65 R, 54 F, 54 R, 180/1 R; 74/665 D, 751, 572; 318/161; 290/22, 31, 45

[56] References Cited
UNITED STATES PATENTS

| | | | |
|---|---|---|---|
| 1,335,249 | 3/1920 | Leymarie | 74/751 |
| 2,078,362 | 4/1937 | Arendt | 180/65 R UX |
| 2,395,904 | 3/1946 | Oetzel | 180/65 R |
| 2,443,770 | 6/1948 | Kasschau | 180/65 R |
| 2,803,151 | 8/1957 | Clerk | 74/751 |
| 2,935,899 | 5/1960 | Nallinger | 74/751 |
| 3,211,249 | 10/1965 | Papst | 180/65 A |
| 3,270,207 | 8/1966 | Stockton | 290/31 |
| 3,493,066 | 2/1970 | Dooley | 180/54 R |
| 3,566,717 | 3/1971 | Berman et al. | 180/65 A X |
| 3,734,222 | 5/1973 | Bardwick | 180/54 R |

*Primary Examiner*—Leo Friaglia
*Assistant Examiner*—David M. Mitchell
*Attorney, Agent, or Firm*—Diller, Brown, Ramik & Wight

[57] ABSTRACT

This disclosure relates to a hybrid drive for vehicles and the like which includes at least two driving motors, at least one of the motors being an electric motor and there being at least one source of power coupled to one of the driving motors. Preferably, one of the motors is a motor having a maximum efficiency within a limited speed range and the other driving motor is one adaptable to varying speeds and loads. Also, the drive will be provided with accumulator means for accumulating unused power such as during periods of low operating requirements or/and during periods of deceleration.

9 Claims, 4 Drawing Figures

HYBRID DRIVE

The invention relates to a hybrid drive with at least two driving motors, the motors including at least one electric motor and at least one source of power coupled to the driving motors. The invention is particularly suited to an intermittent method of operation, such as in motor vehicles which for example in congested areas are subjected to a considerable degree of a "stop and go" traffic. In a like manner there are also uses for the hybrid drive in other vehicles including electric street cars and others cars on rails with different loads because of the acceleration and deceleration found in local, rapid transit traffic.

The intermittent method of operation not only has a disadvantageous effect on the overall degree of effectiveness of the drive but it, at the same time, creates considerable problems concerning noise and emission nuisances.

Since the drive as a rule is designed for the maximum load, disadvantages result whenever the peak performance surpasses the basic performance by a multiple, e.g. unfavorable consumption and emission conditions in the lower partial load area in the case of thermal engines and of a high expenditure for the engine for regulating performance, especially in the case of electric motors.

BACKGROUND OF THE INVENTION

Attempts have previously been made to meet these conditions by means of a hybrid drive, in which an electric driving motor was combined with some other kind of driving engine.

For example, a city car was equipped with a drive in which a hydraulic engine was connected in series with an electric engine (Journal: "Kraftfahrzeugbetrieb und Automarkt" No. 18, 1969). Storage batteries (accumulators) were connected to both engines, with a high and low pressure reservoir (which is disadvantageous because of the additional conversion of energy) being connected to the hydraulic motor and an electro-chemical battery (E-battery) being connected to the electric engine. In this case the hydraulic engine can operate for one thing as an engine (in the case of acceleration fed from the battery) or as a pump (charging the battery during braking). At the same time, the hydraulic motor was used as an accelerating motor, while the electric motor was intended for normal travel. The greater weight, as well as the considerable space requirement of the drive as compared to performance and the necessary conversion of mechanical power into hydraulic power in the case of acceleration or deceleration are disadvantageous in the case of that drive. As a result of the low capacity for power storage the energy remains very small and cannot satisfy the need in the case of extended travel.

Furthermore, a hybrid drive has been known in which an electrical main engine was used as a drive in travel, the motor being supplied with electric energy by an electric battery which is charged by a generator driven by a combustion engine. This type of hybrid drive, which consists predominately of the components of an internal combustion engine and electric motor drive, has the disadvantage that the performance of the combustion engine is transferred not directly and mechanically, but by way of two electric motors to the driving wheels. This requires the installation of an additional charging generator and of heavy and expensive batteries designed for the transfer of the performances (output) of the sum of both driving components, as well as a corresponding decrease of the degree of effectiveness with which the output of the internal combustion engine is transferred. Therefore, twice the amount of the output required for the driving operation, is installed. The main disadvantage of this drive, therefore, is a too low specific output, especially of the electric batteries and thus unsatisfactory travel performances.

A further disadvantage of this known arrangement consists in the fact that the electric component must create high peak performances — occurring for example during stop and go travel — and moments with a positive and negative sign. Particularly the electric batteries and the electronic performance are not suitable for this purpose. The result of this is that the acceleration of a vehicle with such drive is slow and the kinetic energy of the vehicle which is to be converted during braking can only be reconverted for a small part into again usable electro-chemical energy of the battery (regenerative braking); the greater part — just as in the case of conventional drives — must be converted into heat by the friction brakes. These disadvantages will have an even more negative effect with the larger the output portion, the more discontinuously the operation of the internal combustion engine.

SUMMARY OF INVENTION

It is the objective of the invention to eliminate the disadvantages described, especially the double installation of the output, the heavy weight of the drive resulting from it and the poor operating performance of the vehicle, and to create a drive which, particularly in the case of an intermittent operation has a high degree of effectiveness even in the case of regenerating braking and with inexpensive means for the drive for the basic performance, will thus make the desired low cost possible.

According to the invention this will be achieved through the fact that the driving engines are connected to an operating shaft via a differential drive, which addingly combines the performances of the engines. In the case of the addition of the performances of the two driving engines in the differential drive, the rpm's are super-imposed during the equilibrium of moments. Advantageously, a flywheel drive is used in connection with at least one driving engine, as a result of which it will be possible to use smaller or less powerful driving engines which practically only cover the basic performance (output), while the performance peaks are covered because of a multiplication of the performance by the flywheel drive.

According to one embodiment of the invention, it is advantageous if the driving engine connected to the gyro-battery drive is more sluggish with regard to its controller action or is more narrowly limited with regard to its r.p.m. and load area that are to be regulated than the electric engines, whereby the more sluggish driving engine will preferably be the thermal power engine.

At the same time, the thermal power engine constitutes the component for a considerable range of action as well as for essentially stationary conditions, while the more easily controllable engine to which, for example, an electric battery can be connected, makes possible with the flywheel drive to take care of the intermittent mode of operation.

Since the thermal power engine can be driven essentially free of acceleration and in favorable areas of its performance graph, it offers an excellent degree of combustion effectiveness, so that waste gases with an extremely low portion of harmful substances develop and the power consumption is low. The flywheel drive connected to both driving engines supplies or stores a temporary high output during acceleration or deceleration without the known loss of effectiveness resulting from conversion of kinetic energy into some other forms of energy and is preferably connected in parallel to the internal combustion engine.

The principle on which the invention is based is also particularly suited for vehicles in which no emission at all occurs. In that case, it will be advantageous if all driving engines, except for the flywheel drive, are electric engines. The latter can be fed both from a grid, as well as from suitable, electric batteries. Here, too, the operating engine assigned to the flywheel can be more sluggishly or limitedly regulable than the other, corresponding to the principles mentioned above and can essentially take over the task of a continuous operation.

In order to adapt the characteristic curve of the moments of internal combustion and electric engines, and the characteristic curves of the road resistances better to one another, and in order to decrease the r.p.m. and torque conversion range for the electric engine required for a dynamic travel operation (saving in weight and cost) it can also be effective that a torque converter be incorporated between the two driving engines and/or between the differential drive and the driven shaft. In order to travel according to ones choice only with the one or with the other driving engine, a brake has been provided between at least one of the driving engines and the differential drive.

According to a further advantage developed by the invention, at least one source of power is developed as a battery for electric energy independent of the grid. Advantageously, a sensor measuring the state of the charge of the battery is assigned to such an electric battery.

Advantageously, the hybrid drive according to the invention is provided as a front wheel drive. In the case of the front wheel drive, the driving axle is loaded with a relatively large portion of the weight of the vehicle which in addition is considerably increased dynamically during the deceleration of the vehicle. Because of the improved positive connection with the road bed, it will be possible to transmit high braking outputs by way of the front axle and utilize them. The differential drive, at the same time, can be very favorably housed together with the transmission and the differential of the vehicle in one single transmission housing especially when spur gear and planetary gears are used.

According to a further development of the invention, provisions have been made that a sensor responding to charges in the r.p.m. is connected to the driven shaft or to the wheels etc. connected therewith, the outlet of which is connected with the control arrangement of the electric engine. This sensor is particularly suitable for a largely automated control of the vehicle drive without exceeding the limit of adherence between the wheels and the road bed, during braking or acceleration of the vehicle.

A further advantageous characteristic of the invention consists in the fact that an eddy-current brake is disposed on the shaft of the flywheel drive, the rotor of which is the flywheel drive itself.

Subsequently, embodiments of the invention will be explained in more detail by way of example and on the basis of the drawings.

Figure 1:
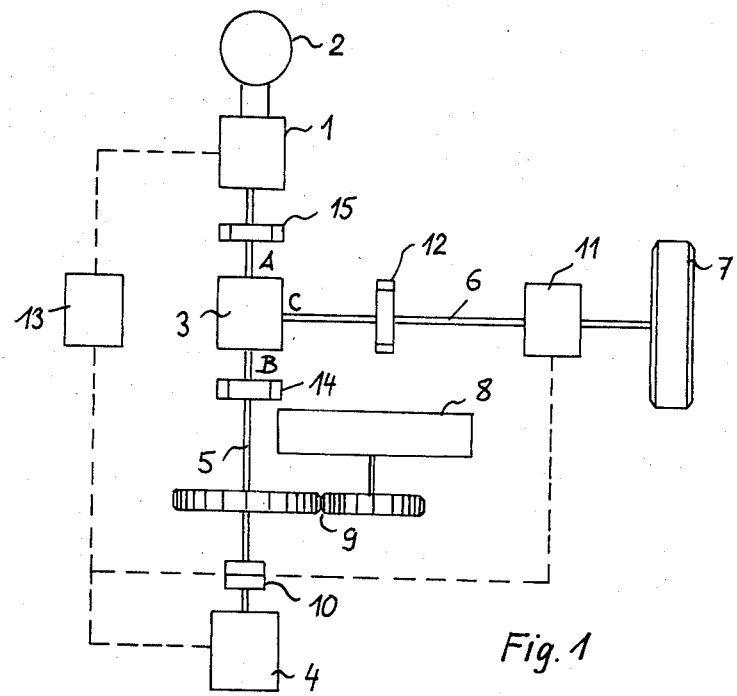
FIG. 1 is a block diagram of an embodiment of a hybrid drive according to the invention.

In FIG. 1 there is an electric engine 1 which is coupled to a differential gearing 3 and is supplied with power by an electric accumulator 2. An additional driving engine, a thermal power engine 4, is also coupled via a shaft 5 to the differential gearing 3. A driven shaft 6 is further connected to the gearing 3 and at least one driving member 7 is connected to the shaft 6.

As additional driving means, especially in order to avoid the initially described disadvantages in the case of an intermittent operation (too high positive and negative performance peaks in the electric part) and in order to operate, even in the case of this type operation, the thermal power engine as continuously as possible, that is to say with only little and/or low change of the speed controlling member, e.g. of the throttle valve for the torque and the rpm, a gyro-accumulator drive (flywheel) 8 has been provided which is connected with the shaft 5 via a transmission gear 9. The gyro-accumulator drive 8 can also be connected with the shaft 5 by means of an overriding clutch (which has not been shown) and which is connected in such a way that in the case of a reduction of the r.p.m. of the shaft 5, the gyro-accumulator drive 8 is coupled rigidly but in the case of an increase of the r.p.m., it is uncoupled except for limited transfer, As a result of this, or of similar arrangements, it is possible for the gyro-accumulator drive to deliver its kinetic energy for a brief time upon acceleration of the vehicle, and thereafter the renewed storing of the power which is necessary takes place slowly. The overriding clutch can also be disposed between the transmission gearing 9 and the shaft 5, or it can also be omitted entirely.

Such a drive with a gyro-accumulator is distinguished by a high power density and by a low price. Advantageously, the gyro-accumulator drive 8 is dimensioned to such size that it not only serves for desensitizing the effect of the thermal power engine but it also contributes a considerable part to the acceleration or deceleration performance of the vehicle. The installed power of the thermal power engine can be decreased correspondingly as a result of that. The overall drive in this case consists of the three different power components which are of about equal value; the electric engine, thermal power engine and gyro-accumulator. In a border case the gyro-accumulator can even replace the thermal power engine.

In order to adapt the characteristic curves of the moment of the thermal power engine and electric engine better in relation to one another, a torque converter 10 is disposed between the two, although the torque connector can be replaced by a conventional coupling.

Therefore, it is possible to provide either a coupling or a torque converter.

In order to also decrease for the electric engine 1 the r.p.m. and torque conversion ranges required for a dynamic travel operation, a torque converter 11 or a part of said converter, preferably the mechanically acting part (gear controlling mechanism) is coupled between the differential gearing 3 and the driving gear 7. Between the differential gearing 3 and the torque converter 11, a manually operated brake 12 is incorporated into the driven shaft 6.

Between the electric engine 1 and the differential gearing 3, as well as between the thermal power engine 4 and the differential gearing 3, manually operated brakes 14 and 15 are additionally incorporated.

The brakes 14 and 15 will permit one to drive according to choice only with the thermal power engine, e.g. in the case of long-distance driving and/or in the case of an exhausted electric accumulator 2, or only with the electric engine 1, e.g. in congested areas in the case of travel without emission. A regulator for the entire hybrid drive is generally identified by the reference numeral 13. It is to be understood that the regulator 13 is only schematically illustrated and that the specific details of the regulator 13 are not a part of this invention. While it is envisioned that the regulator 13 eventually will be in the form of an automatic control device actuated by a single control lever, it is pointed out here that the regulator 13 may equally as well be formed of a plurality of manually actuated control devices. For example, the operation of the engine 4 may be controlled by a conventional foot pedal (not shown). In a like manner, the operation of the electric engine 1 may be by way of a mechanical control device which will control the flow of electrical energy therethrough both as a generator and as a motor. In addition, the torque converters 10 and 11 may be actuated and shifted by conventional shift levers.

The method of operation of the hybrid drive according to FIG. 1 will now be described. First of all, the vehicle is at a standstill, whereby the brake 12 has been applied and the thermal power engine 4 running with a medium r.p.m. and a medium moment, that is to say in the range of little consumption and of favorable emission values. At the same time, the engine 4 drives at this moment the electric engine 1 operating as a generator by way of the differential gearing 3 in an opposite rotational direction or at a negative r.p.m. and thus recharges the electro-accumulator 2. The gyro-accumulator drive 8 rotates with a corresponding higher constant r.p.m.

After the brake 12 has been manually released, the torque, which hitherto had been supported here without loss, acts via the torque converter 11 on the driving member 7 and begins to accelerate the vehicle. At the same time the resistance of the electrical engine 1, functioning as a generator, may be increased via the regulator 13. Since the starting moment of thermal power engine 4 is not changed or changed only very sluggishly in order to avoid higher emission, an imbalance of the moments develops at the shaft connections A, B, C of the differential gearing 3, since the moment at the shaft connection B is too small. The r.p.m. of the outlet B and thus of the gyro-accumulator drive 8 therefore begins to decrease and "automatically" produces a supporting moment at the shaft connection B. In case of a gradual drop in r.p.m. of the shaft connection B, the gyro-accumulator drive delivers its kinetic energy to the vehicle drive and first of all to the electric accumulator 2. The negative r.p.m. of the electrical engine 1 decreases, then passes through its zero value (transition from generator to motor operation) and is increased by means of the controlling means 13 to such a point, as required by the desired travelling speed. The electric power necessary for the drive of the motor of the electrical engine 1 is taken from the electric accumulator 2. At this time it is also pointed out that a DC motor-generator unit will automatically change its function from that of a generator to a motor and vice versa when coupled to a power source and subjected to a variation in torque. This is clearly described on pages 402 and 403 of INTRODUCTION TO ELECTRICAL ENGINEERING by William H. Hayt, Jr. and George W. Hughes, published by McGraw-Hill Book Company, copyrighted 1968, and identified by Library of Congress card No. 68-27506.

A deceleration process takes place in a reverse direction, whereby the kinetic energy is stored with slight conversion losses as electric energy in the electric accumulator 2, and almost without loss of kinetic energy in the gyro-accumulator drive 8.

For the subdivision of the range of speeds, e.g., in the case of slow travel on slopes, the torque converter 11 can be used.

The brakes 14 and 15 have been provided in order to travel only with the thermal power engine 4, in this case it will be effective to also switch on the gyro-accumulation drive mechanically, e.g., in the case of long distance travel and/or of an exhausted battery 2 or to travel only with the electrical motor 1, e.g. in case of travelling without emissions in congested areas.

It is possible by means of known, suitable but not shown arrangements for the transmission of current, to recharge the electric accumulator 2 from the outside, e.g. from the grid, whenever the vehicle is at a standstill, especially at night or in case of a rail-bound operation of the vehicle for example on guide rails, insofar as the vehicle is not already supplied from the grid only, that is, is without electric accumulator.

By means of the corresponding circuit and operation of the controlling means 13, the electric engine 1, with electrical energy supplied from the electric accumulator 2 can furthermore be used for starting of the thermal power engine 4. Furthermore, the electric accumulator 2 or a part of it can be adduced for supplying the power grid aboard the motor vehicle.

The drive, therefore, makes it possible to do without the additional aggregates required in case of vehicels with conventional drives, for example, starters, dynamos, starter battery, the elements of the combustion engine, e.g., a cam shaft located on top and its secondary aggregates, e.g., carburator which are required for quickly changing or very variable operating conditions, a part of the braking system of the vehicle as well as a gearing with reverse speed.

The controlling means 13 can furthermore be developed such, that in the case of division of performance between electric engine 1 and thermal power engine 4 which can be selected within wide ranges of performance, their operating states be controlled as much as possible in such a way, that the heat losses developing, for example, cooling water and exhaust gases, will cover the heat requirements of the vehicles heating system. Thus in the case of a stopped vehicle the thermal power engine 4 can fulfill at the same time the functions of recharging the battery 2 and of heating the vehicle while stopping. Thus the additional aggregate presently utilized in many cases as a heater for a stationary vehicle can be omitted.

Figure 2:
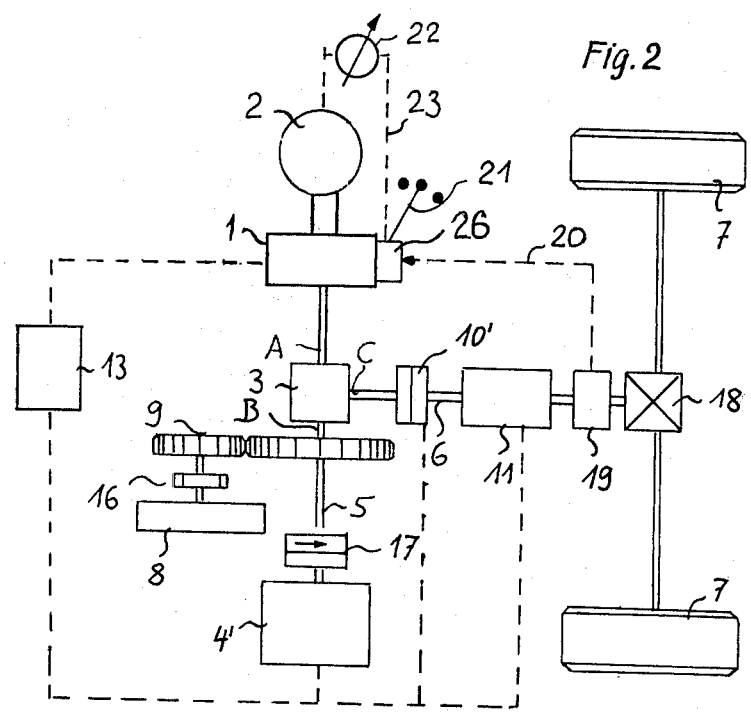
FIG. 2 is a block diagram of a modified embodiment of the hybrid drive of FIG. 1.
Figure 3:
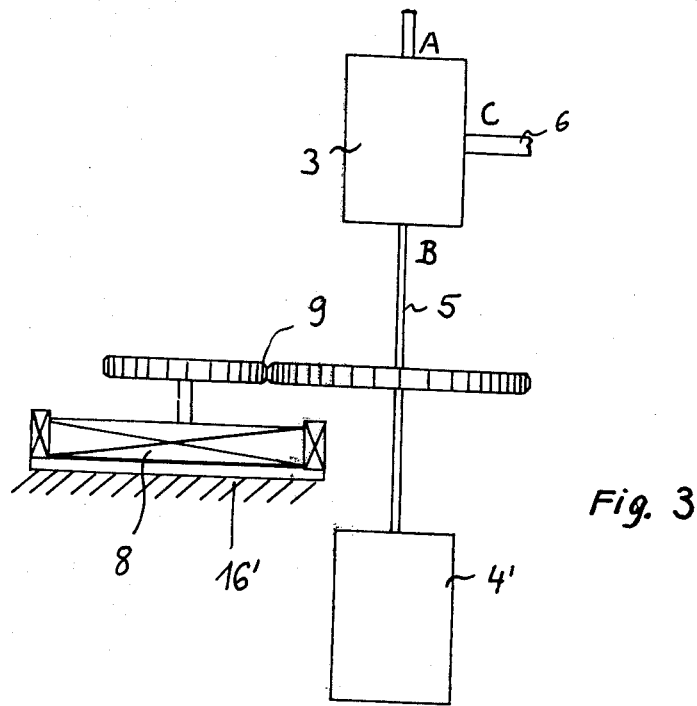
FIG. 3 is a diagrammatic view of a modified detail of the embodiment of FIG. 2.

In FIG. 2 there is illustrated a modified presentation of the hybrid drive according to FIG. 1. In the case of this embodiment, the more sluggish or more limitedly regulable driving engine 4' is developed primarily as an electric motor. Thus, this hybrid drive consists of an electric motor 1, regulable within wide ranges of r.p.m. and output, of a more sluggish or limitedly regulable electric motor 4' and a gyro-accumulator drive 8 connected with it. The coupling 10, shown in FIG. 1, which can also be omitted in this type of drive, is designated by numeral 10' in FIG. 2 in the train of the transmission shaft 6. Between the gyro-accumulator drive 8 and the gearing 9 there is a brake 16, which advantageously is developed as an eddy-current brake. According to a further modification, this brake 16, as illustrated in FIG. 3, is a part of the gyro-accumulator drive 8 itself and constitutes with said drive an unit 16'. The remaining connecting parts in FIG. 3, corresponds to those of FIGS. 1 and 2.

As shown in FIG. 2, an overriding clutch 17, is provided between the driving engine 4' and the reduction gearing 9, the function of which has already been described in FIG. 1. In the case of the embodiment according to FIG. 2, it is also possible to provide the brake 14, 15, shown in FIG. 1, between the driving engines 1 or 4' and the differential gearing 3.

In FIG. 2 there is shown a vehicle drive with two driven wheels 7, which are connected via a differential 18 with the driven shaft 6. A conventional sensor 19 is connected to the driven shaft 6 and feeds changes in the r.p.m., i.e., accelerations or decelerations, via a sensor wire 20 to a conventional control or regulating arrangement 26 of the electric engine 1. The control arrangement 26 has an adjusting arrangement 21, for example, a lever for pre-selection of certain travel characteristics. This preselection can be influenced by the sensor 19. The regulating arrangement 26 is developed preferably as an electronic switching control. Inasmuch as the regulating arrangement 26 is not a required element of the invention and since it is not to be claimed as part of this invention, further details thereof have not been set forth here.

As is further shown in FIG. 2, the electric accumulator 2 is connected with a conventional sensor 22, recording the state of the battery charge. This sensor 22 can also be connected by way of a wire 23 with the regulating arrangement 21. An unnecessary high gear shifting can be prevented for example with the help of the sensor regulation by means of the sensors 19 and 22, or else the pre-selected operating condition can be modified. Beyond that, the sensor 22 prevents any over-charging of the battery 2.

Figure 4:
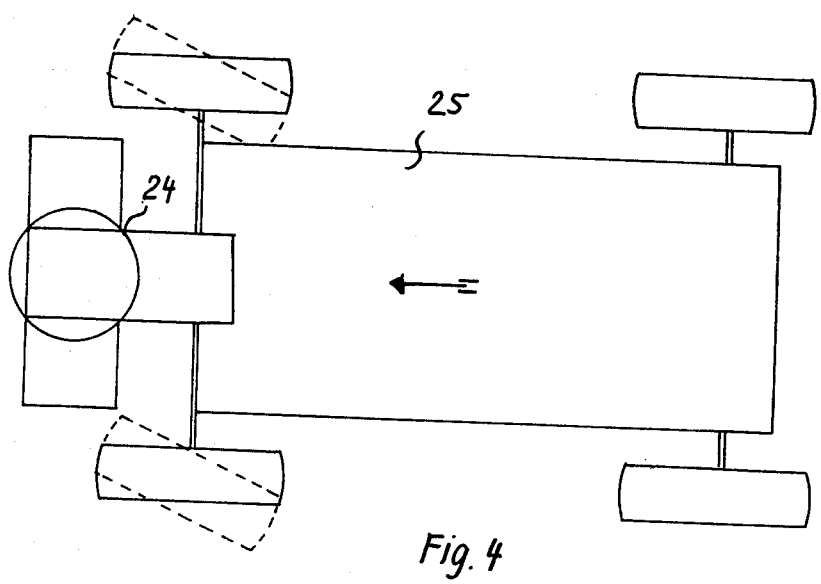
FIG. 4 is a top view of a vehicle with a hybrid drive as a front wheel drive thereof according to the invention.

In FIG. 4 there is illustrated a motor vehicle 25 in top view, wherein the hybrid drive, generally identified as 24, according to the invention is advantageously utilized in a front wheel drive. The hybrid drive 24 can consist either of heterogeneous driving engines or of electric driving engines in connection with a gyro-accumulator drive. Both internal combustion engines as well as steam and turbine engines belong to the class of thermal power engines in accordance with this invention. As a result of the arrangement of the hybrid drive as a front wheel drive, one can achieve a more favorable transmission, especially of the braking torque, and one will be in a position of housing all drive mechanism, especially also the differential, in a single supporting gear housing.

The hybrid drive according to the invention is suitable especially when using at least two electric driving machines and a gyro-accumulator drive, even for the drive of vehicles dependent on the grid, and makes possible in this case too an improvement of the overall degree of effectiveness, especially in case of intermittent operation, and a considerable reduction of the output power peaks in the grid.

The essential advantage of the hybrid drive according to the invention in both types of embodiments consists in that the driving engines need to be designed only for an average load and not, as was customary hitherto for a peak load. The needed peak loads are covered by the gyro-accumulator drive, controlled by the electric machine 1 via the differential gearing 3. At the same time the gyro-accumulator drive 8 also makes possible the use of relatively small driving engines which is particularly useful for the construction of vehicles.

Although only several preferred forms of this invention have been specifically illustrated and described, it is to be understood that further modifications of the drive structure may be made without departing from the spirit and scope of the invention as defined by the appended claims.

I claim:

1. A hybrid drive with at least two driving engines, among them at least one electric machine and at least one power source connected to the driving engines, a differential gearing means having three shafts, one of said three shafts being an output shaft, a brake coupled to said output shaft for restraining rotation thereof, said driving engines being coupled to said differential gearing means by the other two shafts of said three shafts, and the relationship between said other two shafts and said differential gearing means being one wherein when one of said other two shafts is driven in one direction and said output shaft is restrained by said brake against rotation the other of said two shafts is rotated in an opposite direction relative to said driven shaft, said electric machine being an electric generator-motor unit operable first as a generator with the speed of the driving thereof in said opposite direction decreasing to zero as said speed of said output shaft increases with said generator-motor unit thereafter functioning as a motor turning in said one direction and assisting in the driving of said output shaft, said differential gearing means being of the type for adding up the performance of said driving engines, a flywheel, and transmission gearing independently connecting said flywheel to at least one of said other two shafts.

2. A hybrid drive according to claim 1, wherein that driving engine coupled to said flywheel is limited more narrowly in regard to the r.p.m. and load range, than the other driving range.

3. A hybrid drive according to claim 2, characterized in that said more limitedly regulable driving engine is a thermal power engine.

4. A hybrid drive according to claim 1, wherein all of said driving engines are electric machines.

5. A hybrid drive according to claim 1 wherein a brake is provided between at least one of said driving engines and said differential gearing means.

6. A hybrid drive according to claim 1 wherein said power source is in the form of an accumulator for electric energy.

7. A hybrid drive according to claim 6 wherein a sensor measuring the state of the accumulator charge is connected to the electric accumulator.

8. A hybrid drive according to claim 1, wherein an eddy-current brake is disposed on the shaft of said flywheel with said flywheel forming a rotor of said eddy-current brake.

9. A hybrid drive according to claim 1 wherein a one way drive means is provided between said driving engine and said one of said other two shafts which is connected to said flywheel.

* * * * *